United States Patent [19]
Cole

[11] Patent Number: 4,458,789
[45] Date of Patent: Jul. 10, 1984

[54] BRAKE ASSEMBLY FOR A MULTI-DISC BRAKE INCLUDING A FORCE MULTIPLYING DEVICE

[75] Inventor: John F. Cole, Coventry, England

[73] Assignee: Dunlop Limited, London, England

[21] Appl. No.: 354,959

[22] Filed: Mar. 5, 1982

[30] Foreign Application Priority Data

Mar. 14, 1981 [GB] United Kingdom ............... 8108061

[51] Int. Cl.³ .................... F16D 55/00; F16D 65/20
[52] U.S. Cl. ................................ 188/71.5; 188/72.6; 188/72.7
[58] Field of Search ............... 188/71.5, 72.2, 72.6, 188/72.7, 72.8, 24.14, 24.15, 24.16, 43, 72.4, 72.5, 73.2, 365-370, 343, 136, 153, 70, 106 R, 106 A; 74/110

[56] References Cited

U.S. PATENT DOCUMENTS 3,664,468  5/1972  Oka ............................ 188/72.6 X
4,036,329  7/1977  Anderson ..................... 188/72.7
4,235,310  11/1980  Kibler et al. .................. 188/71.5

FOREIGN PATENT DOCUMENTS 1226894  10/1966  Fed. Rep. of Germany.
2426427  12/1975  Fed. Rep. of Germany.
599541   3/1948   United Kingdom.
811489   4/1959   United Kingdom.
1026516  4/1966   United Kingdom.
1092312  11/1967  United Kingdom.
1336979  11/1973  United Kingdom.
1457512  12/1976  United Kingdom.
2026634  2/1980   United Kingdom.
2031540  4/1980   United Kingdom.
1575676  9/1980   United Kingdom.
2094912  9/1982   United Kingdom ............... 188/72.7

Primary Examiner—Douglas C. Butler
Attorney, Agent, or Firm—Stevens, Davis, Miller & Mosher

[57] ABSTRACT

For the pneumatic actuation of a multi-disc brake, plungers which are distributed circumferentially around the thrust ring (not shown) of the disc pack are paired and each pair is driven in the brake-application direction by a common pneumatic actuator. Thrust is transmitted from each actuator to the associated pair of plungers by a respective pair of transmission elements each of which moves at right angles to the associated actuator and plungers, each element having at its opposite ends ball-and-ramp formations with taper angles of less than 45° such that the travel of each element is less than that of the associated actuator and the travel of each plunger is less than that of the associated element but the force applied by each actuator to the associated pair of plungers has twice been multiplied.

7 Claims, 4 Drawing Figures

BRAKE ASSEMBLY FOR A MULTI-DISC BRAKE INCLUDING A FORCE MULTIPLYING DEVICE

The present invention relates to improvements in brakes and more particularly to means whereby a brake of the type in which annular rotor and stator discs are displaceable axially into mutual frictional engagement can be satisfactorily operated pneumatically using the source of compressed air which is available as standard equipment on heavy road vehicles.

In an advantageous form of such a brake a plurality of rotor discs which rotate with the wheel are interleaved with a plurality of stator discs which are constrained against rotation, the brake being applied by axially displacing all of the discs toward a reaction member by means of a thrust ring which is in turn acted upon by a plurality of pressurized fluid operated devices spaced circumferentially around the ring. Since hydraulic fluid is available in heavy road vehicles at higher pressure than compressed air it would be preferable that these thrust applying devices should be hydraulic except that the great heat developed by the disc pack, especially under conditions of prolonged braking, will tend to vapourise the hydraulic fluid. This problem is avoided if the thrust applying devices are pneumatic rather than hydraulic, but conventional heavy road vehicles do not carry as standard equipment air compressors capable of delivering air at a pressure of more than about 690 kPa. In published U.K. Patent Application No. 2,031,540A it is stated that "isolated pneumatic devices receiving air at this pressure would be unsuitable to operate a brake of the multi-disc type " meaning that they would not generate sufficient pressure, bearing in mind that unlike a caliper brake where the "trailing" of the shoes assists the braking action, a multi-disc brake relies for its application entirely upon the axially-applied force so that the efficiency of the brake is directly proportional to brake-application pressure and in practice pneumatic actuators subject to a maximum air pressure in the region of 690 kPa would not generate an adequate braking pressure. The solution proposed in Specification No. 2,031,540A is the substitution of an annular diaphragm for individual pneumatic actuators. The use of a diaphragm, however, gives rise to problems associated with servicing and replacement, and furthermore the braking pressure exerted by an annular diaphragm of approximately the same radial dimensions as the thrust ring, although greater than would be obtained from individual piston-and-cylinder actuators, is nevertheless limited and may not be adequate in all circumstances.

A principal object of the present invention is to provide improved means whereby a multi-disc brake can be operated pneumatically using a source of air at relatively low pressure.

In accordance with the present invention there is provided a brake assembly comprising an annular stator disc constrained against rotation while free to move axially and an annular rotor disc keyed to a wheel to be braked for rotation therewith while free to move axially, a reaction member provided on one side of the discs and a thrust member provided on the other side of the discs axially displaceable toward the reaction member so as to bring the discs into mutual frictional engagement, wherein pneumatically operated brake applying means is provided which comprises a pneumatic actuator and interposed between the actuator and the thrust member an intermediate or transmission element which has a shorter travel than the actuator when displaced thereby but a longer travel than the thrust member when displacing the latter, the element having the effect of multiplying the force of the actuator as transmitted by said element to the thrust member in two stages.

The said element preferably acts on the thrust member via a plunger and may be arranged to move transversely to the direction of movement both of the actuator and the plunger. In a preferred construction, the same actuator is arranged to displace a plurality of intermediate elements which are in turn arranged to displace respective plungers. Twin actuators may be disposed in diametrically-opposite positions relative to an annular thrust member to displace respective pairs of plungers via respective pairs of intermediate elements extending from the actuators in circumferentially opposite direction relative to the thrust member.

Each transmission element may be displaceable by the associated actuator and may displace the associated plunger by means of co-operating ramp surfaces each of which has an angle of inclination relative to the direction of movement of the actuator or transmission element of less than 45°, preferably in the range 21° to 23°. Ball or roller means is preferably interposed between opposed ramp surfaces, which may be parallel.

A preferred embodiment of the invention will now be described with reference to the accompanying drawings, in which.

Figure 2:
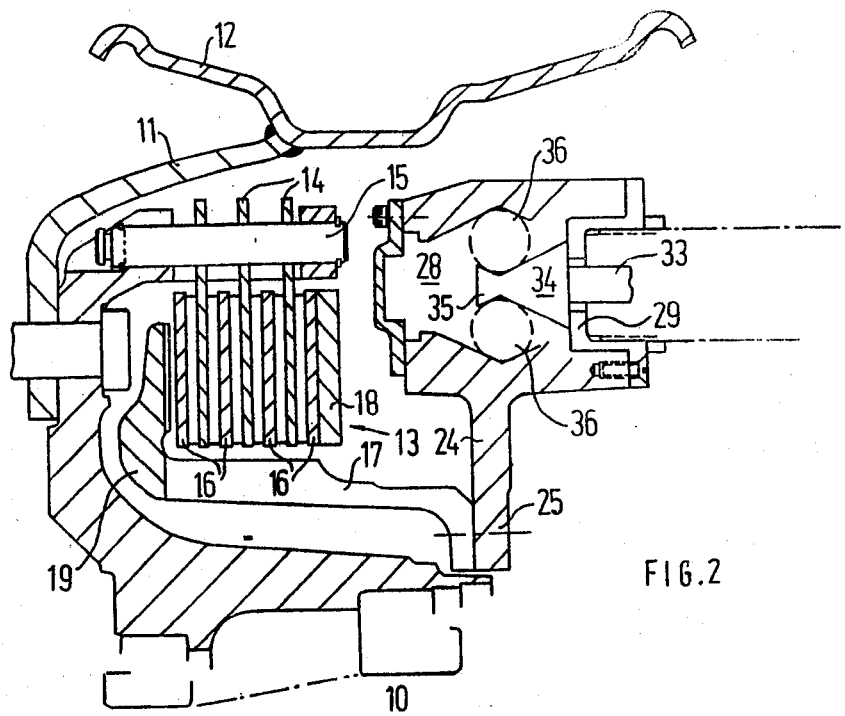
FIG. 2 is a side sectional elevation taken on the line II—II of FIG. 1.
Figure 3:
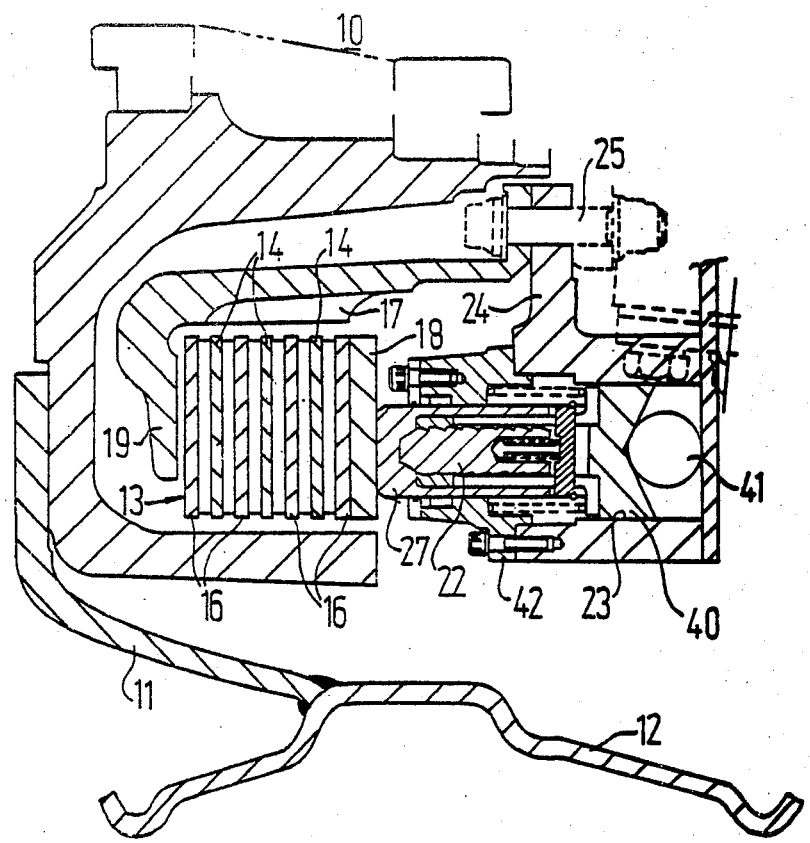
FIG. 3 is a sectional view taken on the line III—III of FIG. 4.

Referring first to FIGS. 2 and 3 of the drawings, there is illustrated an axle 10 on which a wheel 11 is rotatably mounted. Mounted within the rim 12 of the wheel is multi-disc brake assembly 13 which comprises a plurality of rotor discs 14 keyed to a drum 50 fixed to the wheel 11 (in the example shown the rotor discs being of the kind described and illustrated in U.K. Patent application No. 2,074,262A) the rotor discs being interleaved with a plurality of stator discs 16 which are keyed to a torque tube 17 fixed relative to the axle 10. The rotor disc segments engage the drum 50 by pins 15 passing through holes in their radially outer peripheries. The stator discs 16 engage the torque tube 17 by keys projecting from the radially inner peripheries of the stator discs which engage in axially elongated, circumferentially spaced slots in the torque tube. By this arrangement the stator and rotor discs can be axially displaced into mutual frictional engagement to apply the brake when a thrust ring 18 at one end of the disc pack, which is keyed to the torque tube 17 in the same manner as the stator discs, is moved toward a reaction flange 19 extending radially from the outboard end of the torque tube 17.

Means for applying a thrust to the ring 18 in the direction of the reaction flange 19 to apply the brake comprises four plungers 27 (see also FIG. 1) in circumferentially spaced relation around and displaceable into contact with the thrust ring 18. Movement of the plungers 27 to move the thrust ring 18 toward the reaction flange 19 will compress the pack of interleaved rotor discs 14 and stator discs 16. A slack adjustment mechanism 22 of the kind described in U.K. Patent Application No. 2082701A is incorporated in each plunger 27 to compensate for wear of the brake discs.

Figure 1:
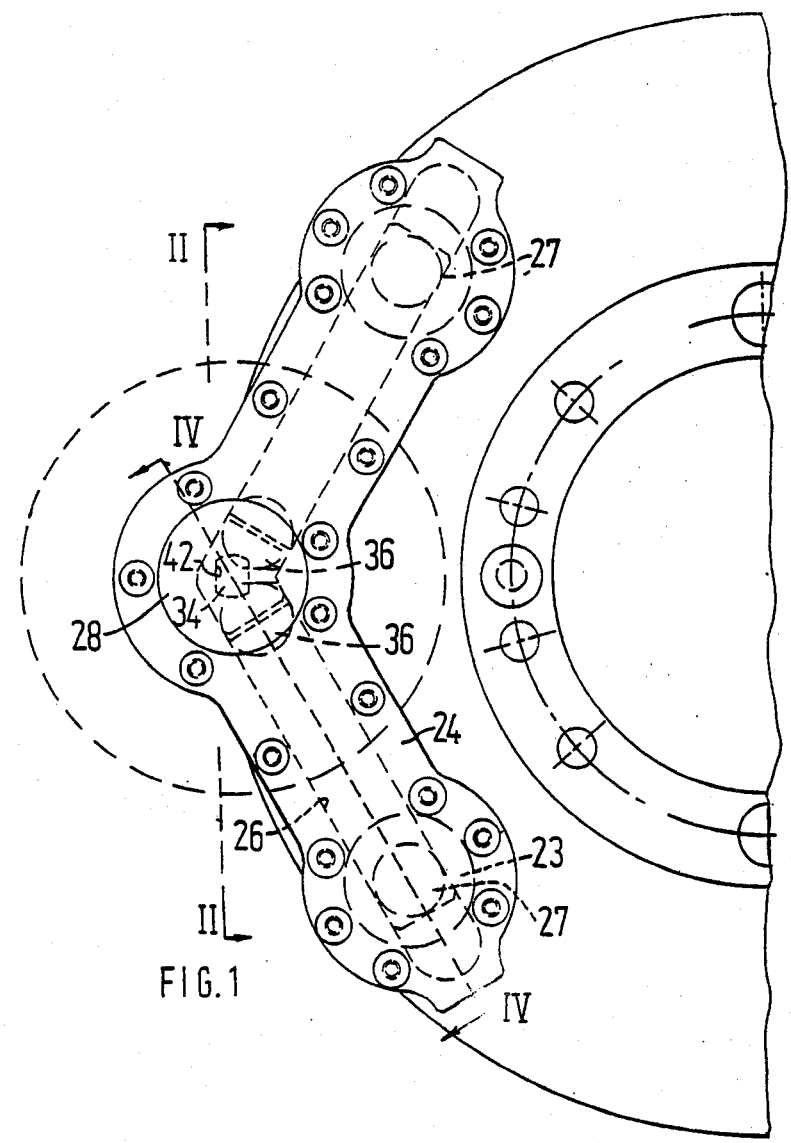
FIG. 1 is an end view of one half of a brake assembly in accordance with the invention.

Each plunger 27 is guided for reciprocative movement toward and away from the reaction flange 19 in a respective cylindrical bore 23 in a support structure 24 which is fixed relative to the reaction flange 19 and axle 10 by bolts 25. Each bore 23 is at one end of and at right angles to a passageway 26 in the structure 24, the other end of the passageway opening to a central chamber 28 of each structure 24 which is in turn aligned with the leading end 29 of a pneumatic actuator. FIG. 1 illustrates a left-hand half of the complete assembly which comprises two support structures 24 (only one being shown) at diametrically opposite positions about the thrust ring 18, each structure 24 comprising two passageways 26 which extend in circumferentially opposite directions relative to the thrust ring 18 from a central actuator chamber 28 to respective plunger bores 23 so that each of the two actuators 29 provided will operate two plungers 27, as will be described.

Within each passageway 26 an intermediate, force-transmission element 30 (FIG. 4) is movable, being biased by a respective compression spring 31 radially inwardly toward the associated chamber 28 and preferably being guided for movement in the passageway 26 in a key engaging a keyway (not shown) at 32. The leading end of the stem 33 of each actuator has, in the section of FIG. 2, a tapered formation 34 with a free end portion 35 of reverse taper. Each formation 34 thus presents opposite ramp surfaces which co-operate with ball 36 interposed between the formation 34 and the nearer ends 37 of the two associated elements 30 which are shaped to present toward the formation 34 ramp surfaces generally parallel to those of the formation 34.

Figure 4:
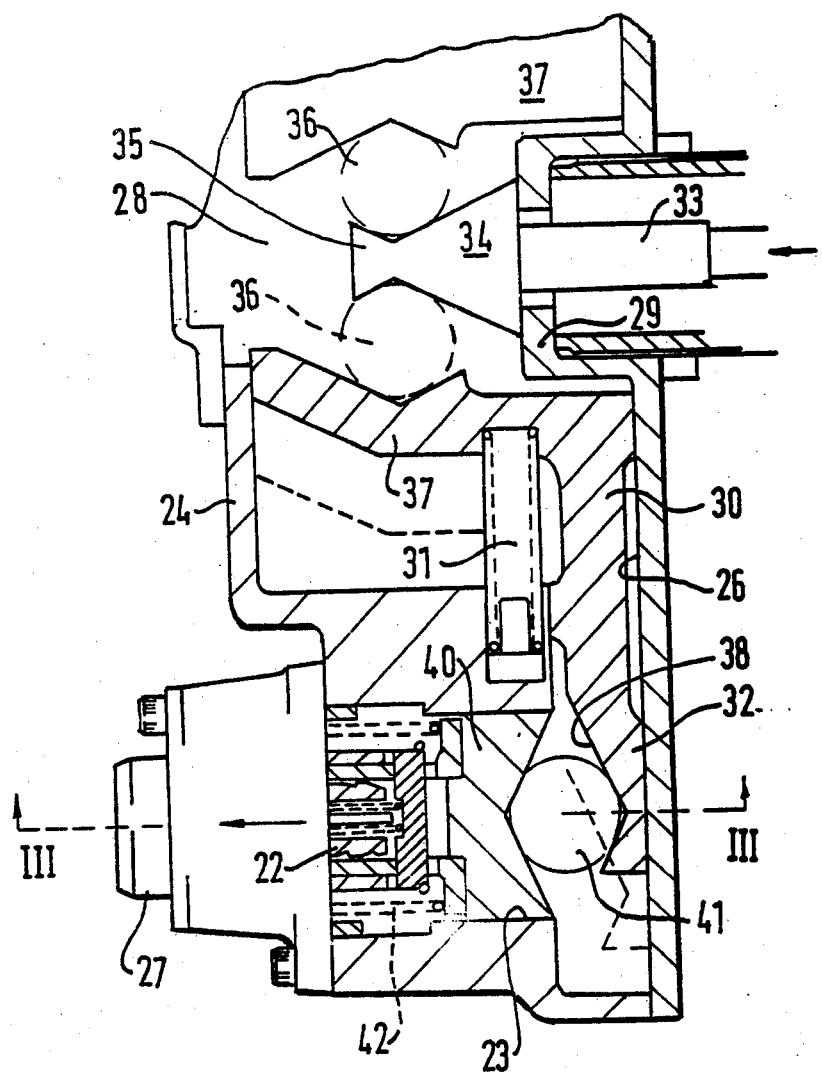
FIG. 4 is a view with parts removed on the line IV—IV of FIG. 1.

Similarly, the radially outer end portion of each element 30 is cut away to present oppositely directed ramp surfaces 38 and 39 toward the nearer end of the associated plunger 27 which has an integral end formation 40 presenting a conical surface toward the element 30, the taper angle of the cone being such that in the section of FIG. 4 the sides, of the cone are generally parallel with the ramp surfaces 38 and 39. A ball 41 is interposed between the conical surface of each plunger end portion 40 and the associated ramp surfaces 38 and 39 of the associated element 30.

In order that each actuator 29 will have a forcemultiplying effect upon the two associated transmission elements 30, and in order that each of the latter will have a force-multiplying effect upon the associated plunger 27 the taper angle of the formation 34 and the angle of inclination of each ramp 38 is less than 45°, and is preferably in the range 21°-23°. In the case of the end formation 34 the "taper angle" means, of course, the similar angle which each side of the formation inboard of the end portion 35 makes with the axis of the stem 33. Similarly the angle of inclination of each ramp 38 refers to the angle which the ramp (or its median plane of it is not flat) forms with the axis of the elongated portion of the associated transmission element 30.

As is most clearly apparent from FIG. 1, the ramp surfaces of the formation 34 are made by cutting out side portions of an otherwise part-cylindrical extension of the stem 33 which slides on a reaction plate 42 mounted in the structure 24 and serving to receive the reaction forces applied to the formation 34 as it forces apart the two balls 36.

Each of the two pneumatic actuators is connectable, to apply the brake, to a source of compressed air carried by the vehicle having the wheel 11. Admission of compressed air to each actuator causes it to move toward the thrust ring 18 (i.e. to the left as viewed in FIG. 4) thus forcing apart the associated balls 36 which ride up the inner ramp surfaces of the formation 34 and up the parallel ramp surfaces of the ends 37 of the elements 30 causing the latter also to move apart against the force of the springs 31 but because of the angles of the ramps of the ball and ramp transmission the travel of each element 30 is less than that of the associated actuator stem 33. Movement of each element 30 radially outwardly of the associated chamber 28 (e.g. downwardly as viewed in FIG. 4) causes the ball 41 to ride up the ramp surface 38 and the conical surface of the end portion 40 of the plunger 27, where this is parallel with ramp 38, so that the radial movement of each element 30 is coverted into movement of the associated plunger 27 parallel with the associated actuator stem 33 toward the reaction flange 19 but the travel of each plunger 27 is less than that of the associated element 30 because of the angles of the ramp surfaces whereby movement of each element 30 is converted into movement at right angles thereto of the associated plunger 27.

According to well-known principles of mechanical engineering the reduction in travel of each element 30 relative to the associated actuator and the reduction in travel of each plunger 27 relative to the associated element 30 gives rise to a proportional increase of force application so that although each plunger 27 moves less for toward the reaction flange 19 than the associated actuator stem 33 it is subject twice to a force-multiplying effect in two discrete stages so that the force which it applies to the thrust ring 18 is greatly in excess of the force which the associated actuator is capable of applying in the direction of movement of its stem 33. The relatively small movement of the plungers 27 is adequate to bring the rotors 14 and stators 16 into mutual frictional engagement and to compress them between the thrust ring 18 and reaction flange 19 so as to apply the brake. It will be apparent that the inclination of the various ramp surfaces to the direction of movement of the component formed therewith can be varied according to different operational requirements so as to vary the force-multiplying effect of each actuator on the associated elements 30 and the force-multiplying effect of each element 30 on the associated plunger 27.

When brake pressure is to be relieved compressed air is discharged from the actuators whereupon each element 30 is moved radially inwardly by the associated spring 31 (i.e. from the dotted line to the full line position as shown in FIG. 4) permitting the return movement of each plunger 27 under the influence of its own compression spring 51.

Having now described my invention-what I claim is:

1. A brake assembly comprising an annular stator disc constrained against rotation while free to move axially and an annular rotor disc keyed to a wheel to be braked for rotation therewith while free to move axially, a reaction member provided on one side of the discs and a thrust member provided on the other side of the discs axially displaceable toward the reaction member so as to bring the discs into mutual frictional engagement, pneumatically operated brake applying means which comprises a pneumatic actuator, and interposed between the actuator and thrust member an intermediate thrust transmission element which acts on the thrust member via a plunger and is arranged to move transversely to the direction of movement both of the actuator and the plunger, the intermediate thrust transmission element having a shorter travel than the actuator when displaced thereby but a longer travel than the thrust member when displacing the latter, the element having the effect of multiplying the force of the actuator as transmitted by said element to the thrust member in two stages, and the same actuator being arranged to displace a plurality of intermediate thrust transmission elements which are in turn arranged to displace respective plungers.

2. A brake assembly comprising a rotatable friction member and a non-rotatable friction member, said friction members being relatively axially movable and frictionally engageable with one another, a thrust member at one side of the friction members and a reaction member at the other side of the friction members and a pneumatic actuator for moving the thrust member to apply the brake, an intermediate thrust transmission element interposed between the pneumatic actuator and the thrust member, the pneumatic actuator and the intermediate thrust member each having a ramp and a rolling member interposed between said ramps to transmit thrust from the pneumatic thrust member to the intermediate thrust transmission element, and the intermediate thrust transmission element having a further ramp co-operating with a ramp associated with the thrust member via a further rolling member to transmit thrust from the intermediate thrust transmission element to the thrust member, whereby the force of the actuator is multiplied in two stages in its transmission to the thrust member.

3. A brake assembly as claimed in claim 2, wherein the said intermediate thrust transmission element acts on the thrust member via a plunger on which a ramp is formed to receive the thrust from the intermediate thrust transmission element, and wherein the intermediate thrust transmission element is arranged to move transversely to the direction of movement both of the actuator and of the plunger.

4. A brake assembly as claimed in claim 3 wherein the same pneumatic actuator is arranged to displace a plurality of intermediate thrust transmission elements which are in turn arranged to displace respective plungers.

5. A brake assembly as claimed in claim 4 wherein twin actuators are disposed in diametrically-opposite positions relative to an annular thrust member to displace respective pairs of plungers via respective pairs of intermediate thrust transmission elements extending from the actuators in circumferentially opposite directions relative to the thrust member.

6. A brake assembly as claimed in claim 3 wherein the intermediate thrust transmission element is displaceable by the pneumatic actuator by means of co-operating ramp surfaces each of which has an angle of inclination relative to the direction of movement of the actuator of less than 45° and wherein the plunger is displaceable by the intermediate thrust transmission element by means of co-operating ramp surfaces each of which has an angle of inclination to the direction of movement of the intermediate thrust transmission element of less than 45°.

7. A brake assembly as claimed in claim 3 wherein said angles of inclination are in the range 21°–23°.

* * * * *